(12) United States Patent
Bingham

(10) Patent No.: US 9,853,923 B2
(45) Date of Patent: Dec. 26, 2017

(54) CAPTURING A CONTENT OBJECT IN A MESSAGING SYSTEM

(71) Applicant: Justin Bingham, Pleasant Grove, UT (US)

(72) Inventor: Justin Bingham, Pleasant Grove, UT (US)

( * ) Notice: Subject to any disclaimer, the term of this patent is extended or adjusted under 35 U.S.C. 154(b) by 101 days.

(21) Appl. No.: 14/195,548

(22) Filed: Mar. 3, 2014

(65) Prior Publication Data

US 2015/0058746 A1 Feb. 26, 2015

Related U.S. Application Data

(60) Provisional application No. 61/771,087, filed on Mar. 1, 2013.

(51) Int. Cl.

| | |
|---|---|
| *G06F 3/00* | (2006.01) |
| *H04L 12/58* | (2006.01) |
| *G06F 3/0484* | (2013.01) |
| *G06Q 50/00* | (2012.01) |
| *G06Q 10/10* | (2012.01) |
| *H04L 29/08* | (2006.01) |
| *G06F 3/0481* | (2013.01) |
| *H04L 29/06* | (2006.01) |
| *H04L 12/18* | (2006.01) |

(52) U.S. Cl.
CPC ........ *H04L 51/046* (2013.01); *G06F 3/04842* (2013.01); *G06Q 10/107* (2013.01); *G06Q 50/01* (2013.01); *H04L 12/1831* (2013.01); *H04L 51/10* (2013.01); *G06F 3/0481* (2013.01); *H04L 12/1827* (2013.01); *H04L 29/06* (2013.01); *H04L 29/08072* (2013.01)

(58) Field of Classification Search
USPC ......................................... 715/752, 748, 756
See application file for complete search history.

(56) References Cited

U.S. PATENT DOCUMENTS

| | | | | |
|---|---|---|---|---|
| 2009/0249225 | A1* | 10/2009 | Beswick | H04N 7/17309 |
| | | | | 715/756 |
| 2009/0317060 | A1* | 12/2009 | Han | G11B 27/034 |
| | | | | 386/248 |
| 2013/0128058 | A1* | 5/2013 | Sagayaraj | H04N 5/225 |
| | | | | 348/207.1 |

OTHER PUBLICATIONS

N. Moenne-Loccoz, Interactive retrieval of video sequences from local feature dynamics, 2005, Springer-Verlag.*

Massimo Brignone, A system for beach video-monitoring: Beachkeeper plus, Dec. 2012, Elsevier Science Ltd., vol. 49, pp. 53-61.*

* cited by examiner

*Primary Examiner* — Doon Chow
*Assistant Examiner* — Tam Tran
(74) *Attorney, Agent, or Firm* — Thorpe North & Western, LLP.

(57) ABSTRACT

A technology for a computing device that is operable to capture a content object. A first content object can be received from a first computing device via a graphical user interface. The first content object can be displayed on a display screen of the computing device using a graphical user interface. A contemporaneous response object can be captured from a camera of the computing device at a time contemporaneous to the time the first content object is displayed.

10 Claims, 9 Drawing Sheets

CAPTURING A CONTENT OBJECT IN A MESSAGING SYSTEM

RELATED APPLICATIONS

This application claims the benefit of and hereby incorporates by reference U.S. Provisional Patent Application Ser. No. 61/771,087, filed Mar. 1, 2013.

BACKGROUND

The Internet can be a space for sharing content among users and such content may include video clips, audio segments, photographs, and the like. Sharing can be accomplished in many ways, including direct transfer of such content from one user to another (e.g. e-mail) and the posting of such content on a website so that the content may be available to visitors of the website. Many users desire more interaction with other users and use more advanced forms of content sharing, such as video conferencing, chat rooms, or online group hangouts.

To further create a more interactive social media experience, social networks, such as Facebook® and Myspace® have been created. Users can connect to social networking services through existing web-based platforms via a computing device (e.g., tablet or smartphone, etc.). Users often share their relationship status, geographic information, social life information, or other personal information using the social networking services. Other users of the social networking services can later comment or post feedback to the user posting such information, which can create a deferred interaction between multiple users.

While many social networking applications and websites provide users with a platform to share information with others and receive feedback, the feedback received from others users is delayed. For example, users may view shared information but not respond to the information or provide feedback to the user until a later time after the viewing. Sometimes a user may access shared content and not respond at all.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
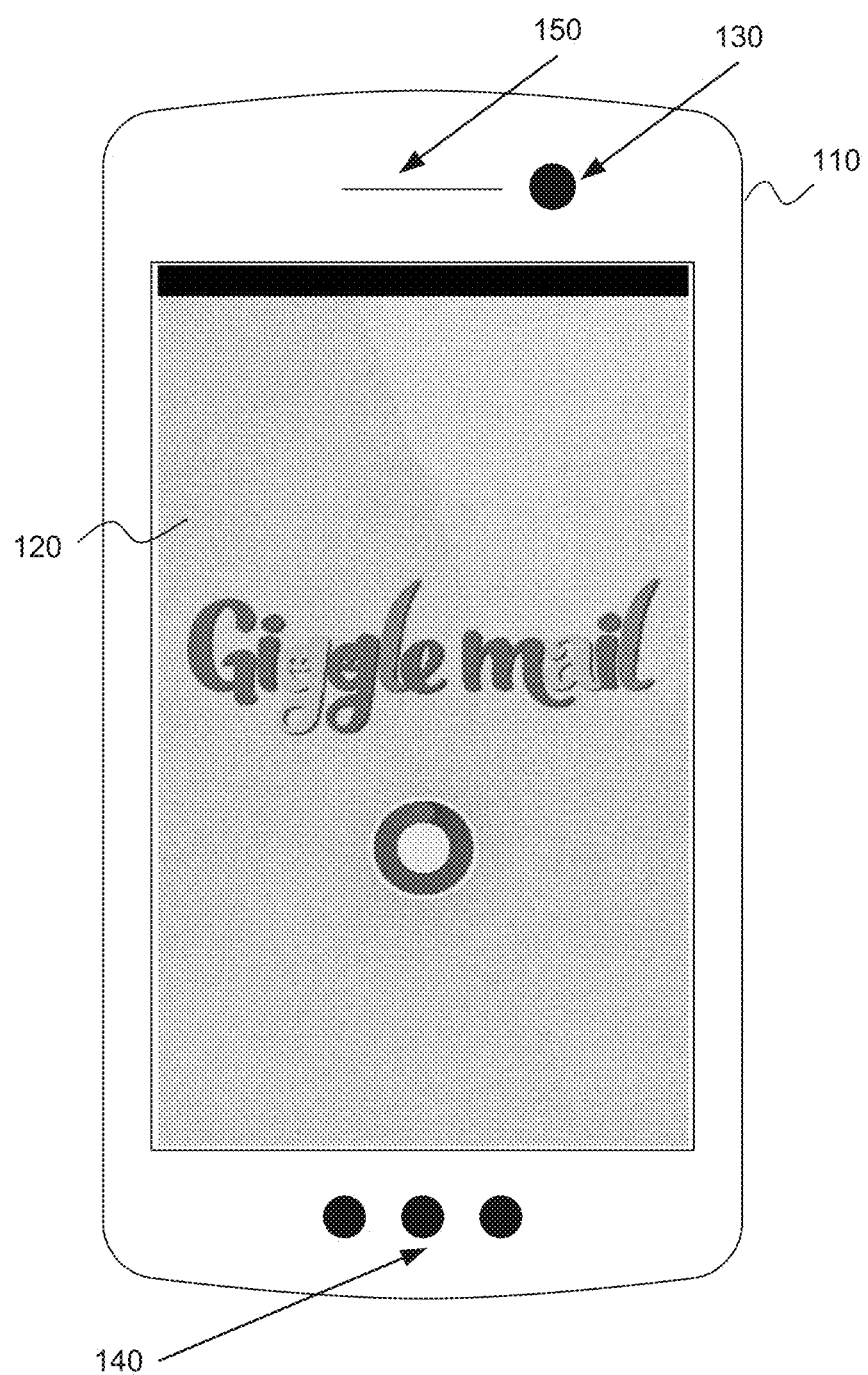
FIG. 1 illustrates a computing device with a graphical user interface showing an initial login screen in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Information sharing, such as direct online communication and social media platforms provide users with the ability to share information, such as video and photos with others. Often the information shared invokes an emotional response. For example, an individual may share a funny picture or joke with a friend and the friend may react to the funny picture or joke by laughing. In another example, an individual may be pregnant and share an announcement with friend and family regarding the pregnancy and the friends and family may react to the announcement with excitement. Typically, the individual sharing the information using email or social media platforms is not able to view the real-time reaction when the information is accessed.

A technology is provided to enable a sender to share information with one or more individuals and capture an image or video of a real-time reaction of a recipient to the shared information. The immediate reaction can be sent back to the sender of the shared information to enable the sender to view the recipient's reaction to the shared information. An immediate reaction is a recipient's reaction that is recorded while the recipient is viewing, reading, or other consuming the shared information or content object. In one embodiment, the sender can view the immediately recorded reaction the shared information at a time the shared information is received. For example, the sender can receive the immediate reaction of a recipient as recorded in a content object and the send can then wait to view the real-time reaction of the recipient when the sender is in a location that provides privacy. In one embodiment, the sender can share the immediate reaction of the recipient with other selected individuals.

In one example, the technology can use a graphical user interface on a computing device. The computing device can include cellphones, tablets, laptop or desktop computers, and so forth. For example, one mobile computing device, such as a cellphone or a tablet, can provide a graphical user interface for a user to share information or a content object with one or more individuals and another mobile computing device can capture an image or video of an immediate reaction of a recipient to the shared information.

FIG. 1 illustrates an example of a computing device 110 with a graphical user interface 120. The graphical user interface 120 can authenticate the identity of the user, such as by requesting log in information, at an initial screen of the graphical user interface 120, and the graphical user interface can be used to capture a content object. In one embodiment, the computing device 110 can store user identification information to provide automatic login of the user into the graphical user interface 120. For example, when a user initially logs into the graphical user interface 120 for the first time, the user can create a user account that links the computing device 110 to the user account. In this example, after the creation of the user account, the user can be automatically logged into the graphical user interface. In one exemplary embodiment, the computing device 110 can include a content object capturing sub-system. The content object capturing sub-system can include a front camera 130, a microphone 140, and a speaker 150. In another embodiment, the content object capturing sub-system can include a back camera.

Figure 2:
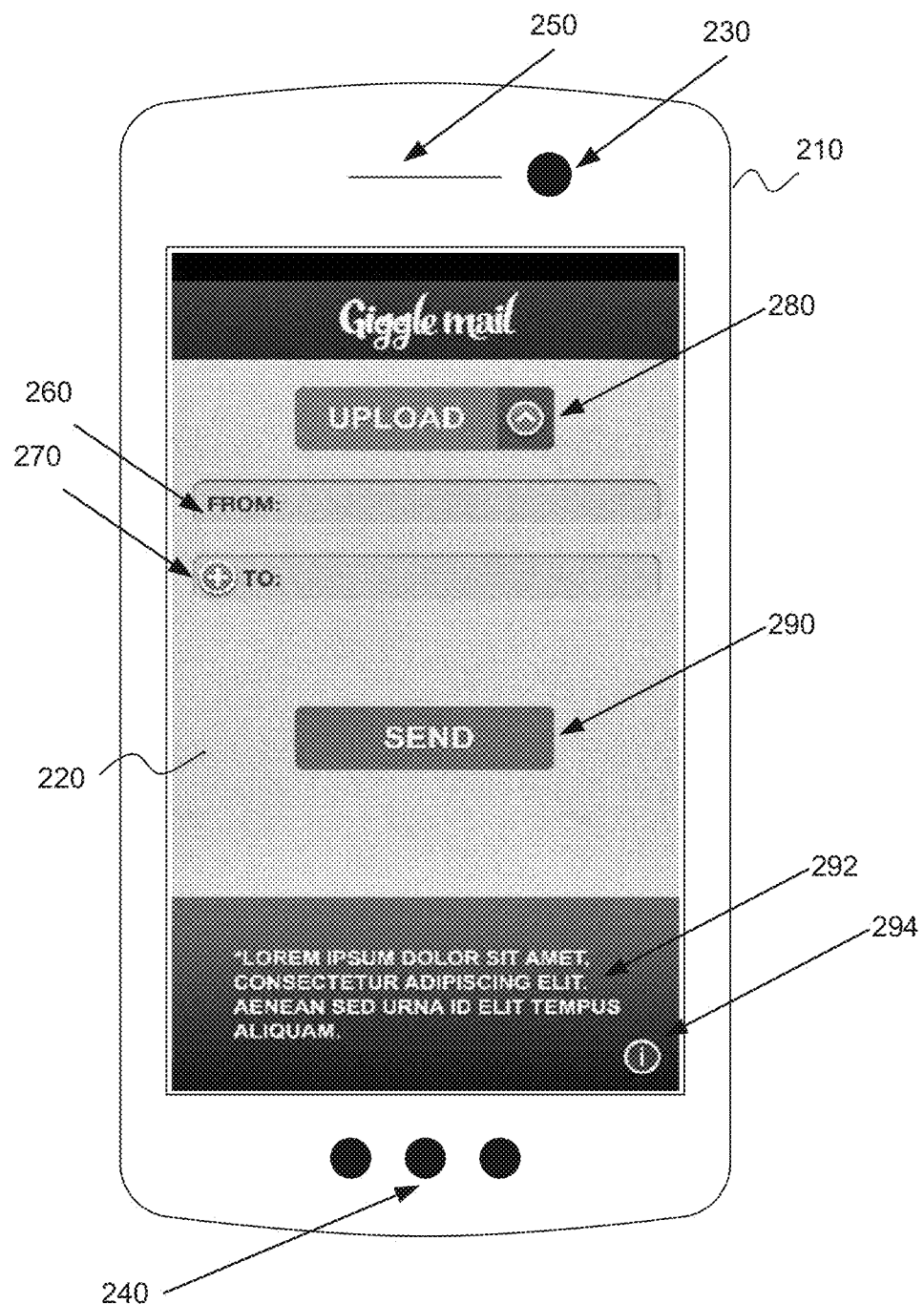
FIG. 2 illustrates a computing device with a graphical user interface showing an input interface to input a sender designation and a receiver designation in accordance with an example.

FIG. 2 illustrates an example of a computing device 210 with a graphical user interface 220. The graphical user interface 220 can provide a user with an input interface to input a sender designation 260 and a receiver designation 270. A user of the input interface can select a recipient of a content object using the receiver designation 270, and select a sender of the content object using the sender designation 260. For example, the sender designation 260 and/or the receiver designation 270 can be email addresses, phone numbers, social media platform user identifications, or other identifying recipient information. In one embodiment, the computing device 210 can store the user information, including sender designation information and automatically designate the user of the graphical user interface 220 as the sender. For example, the graphical user interface can determine that the computing device 210 is associated with a selected user account and automatically input the sender designation 260 to be the selected user account. In one embodiment, a user associated with the computing device 210 or a user associated with graphical user interface 220 can be the default sender designation 260.

The graphical user interface 220 can include an upload button 280 to enable a user to select a content object to send to the recipient indicated in the receiver designation 270. In one embodiment, the upload button 280 can enable a user to engage a content object capturing sub-system. The content object capturing sub-system can include a front camera 230, a microphone 240, and a speaker 250. In another embodiment, the content object capturing sub-system can include a back camera. The content object capturing sub-system can engage the front camera 230 or the back camera to capture a content object of the user who is using the sub-system or device (e.g., live capture or a capture of a recorded material). For example, the content object can be a video or photo of the user of the graphical user interface 220. In another embodiment, the upload button 280 can enable a user to select an object content stored on the computing device 210 or available to the computing device 210. For example, the upload button 280 can enable a user to select a photo or video stored on the computing device 210 or select a content object on a website that the computing device 210 has access to. Accordingly, the graphical user interface 220 can include a send button 290 to enable a user to send the content object previously uploaded using the upload button 280, to the recipient designated at the receiver designation 270. In one example, the graphical user interface 220 can include a message display section 292. The message display section 292 can display messages to a user such as usage instructions, tips, updates, error messages, or other information. In one example, the graphical user interface 220 can include a settings button 294. The settings button 294 can enable a user of the graphical user interface to change settings of the graphical user interface 220, such as user preferences, system settings, and so forth. In one embodiment, the settings button 294 can enable a user to switch a user account associated with the computing device 210 to another user account (e.g., logout of a current user account and into another user account).

Figure 3:
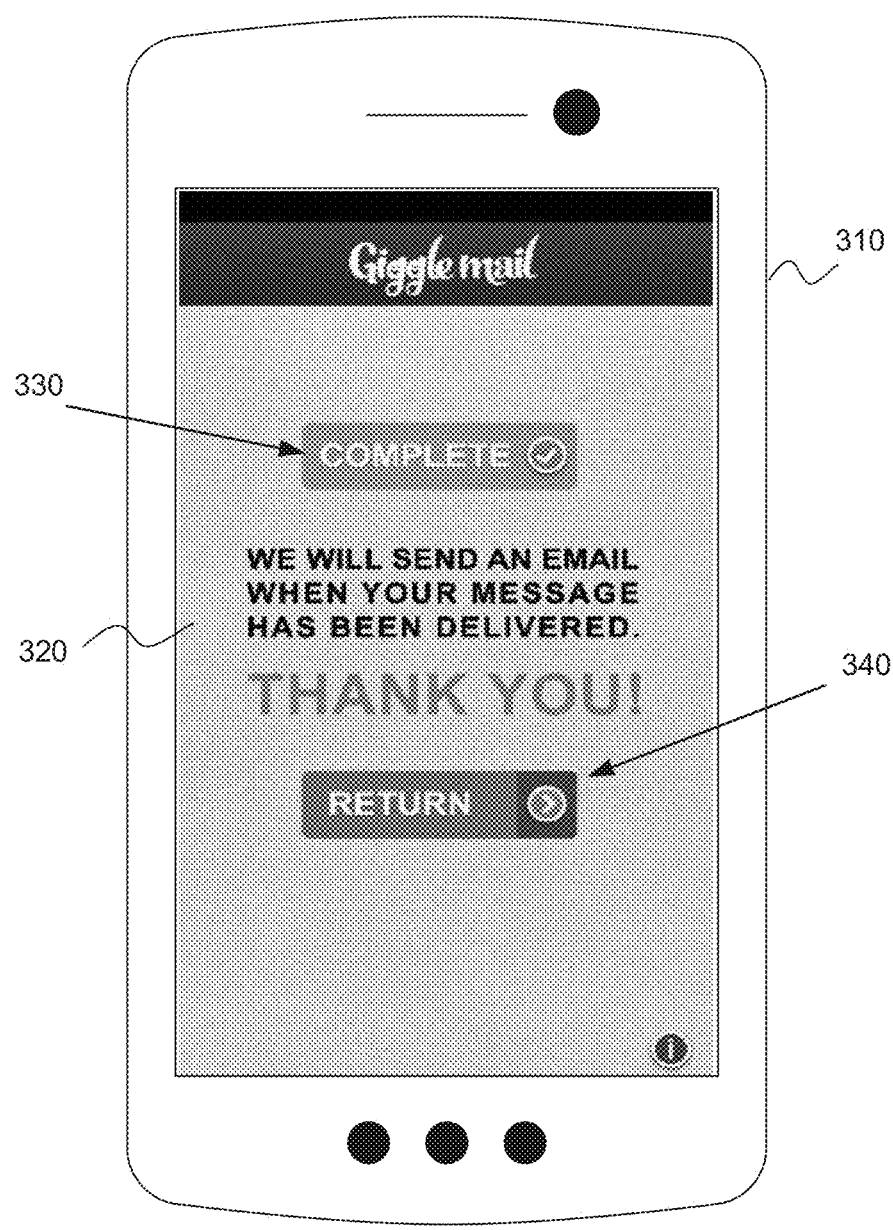
FIG. 3 illustrates a computing device with a graphical user interface showing a sending status of a content object to be sent to a recipient in accordance with an example.

FIG. 3 illustrates an example of a computing device 310 with a graphical user interface 320. The graphical user interface 320 can indicate to a user a sending status of content object to be sent to a recipient. The graphical user interface 320 can include a status indicator 330. In one embodiment, the status indicator 330 can indicate to the user that the content object was successfully sent to a selected recipient. The graphical user interface 320 can include a home or return button 340 that returns the user of the graphical user interface 320 to another page in the graphical user interface, such as a home page.

In the illustrated example, the message may be received by client software residing on a recipient device. For example a messaging client may reside on a portable device such a mobile phone, tablet, laptop or another computing device. When the message is received at the messaging client, the recipient may be notified that a message has been received.

Figure 4:
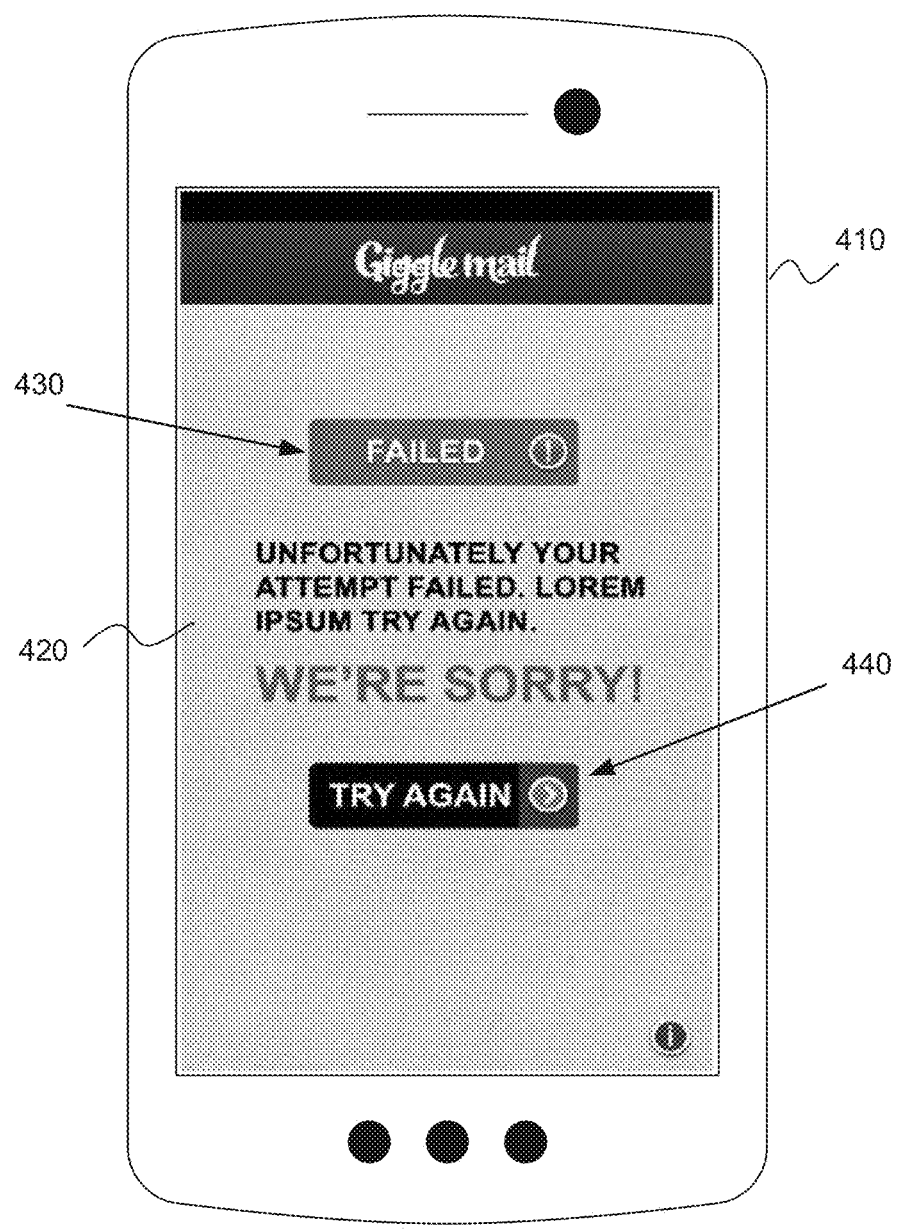
FIG. 4 illustrates a computing device with another graphical user interface showing a sending status of content object to be sent to a recipient in accordance with an example.

FIG. 4 illustrates an example of a computing device 410 with a graphical user interface 420. The graphical user interface 420 can indicate a sending status of content object to be sent to a recipient. The graphical user interface 420 can include a status indicator 430. In one embodiment, the status indicator 430 can indicate to the user that the content object was unsuccessful and not sent to a selected recipient. The graphical user interface 420 can include a try again button 440 that provides the user with the option to have the graphical user interface 420 attempt to send the content object to the user again.

Figure 5:
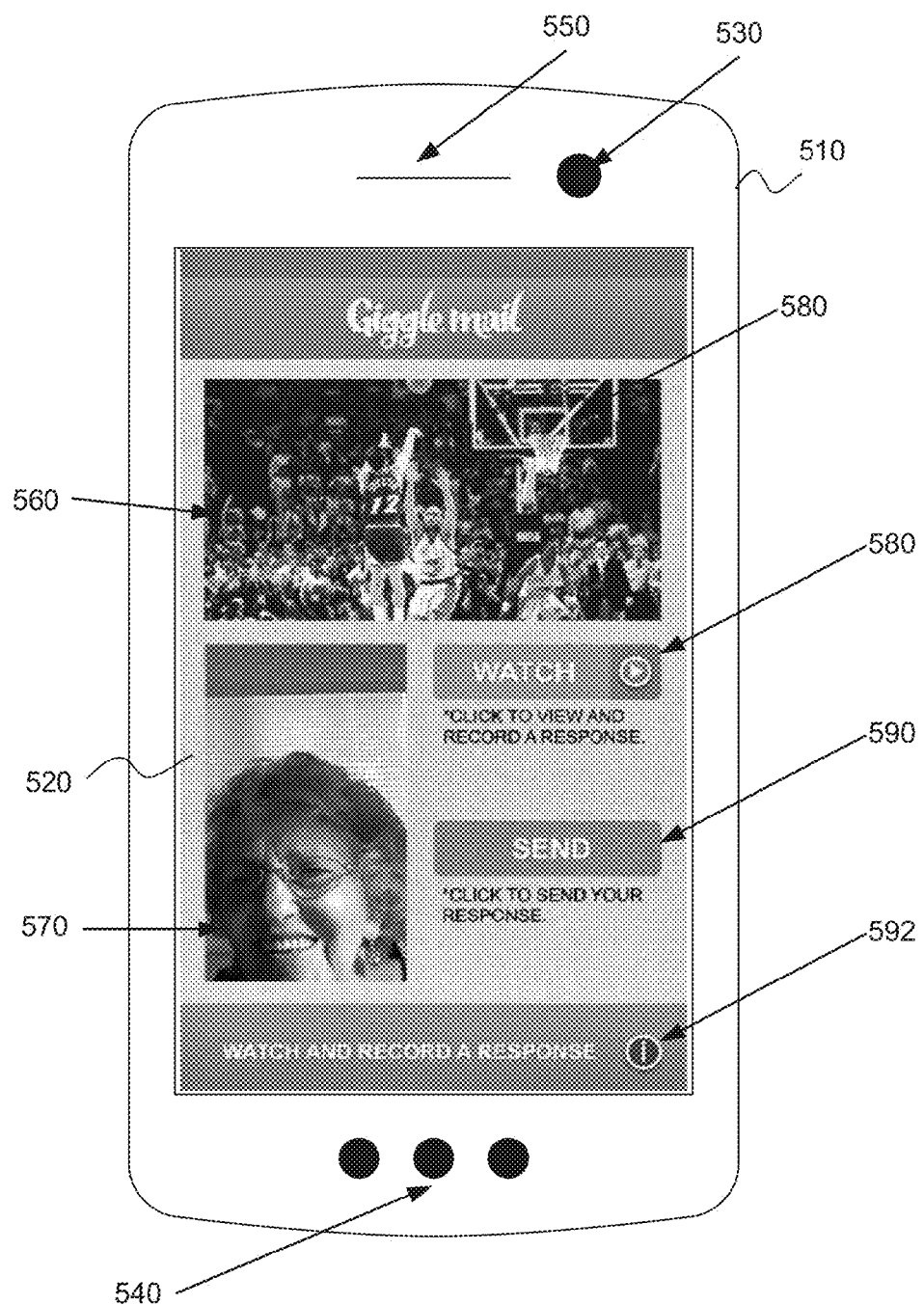
FIG. 5 illustrates a computing device with a graphical user interface to show a content object in accordance with an example.

FIG. 5 illustrates an example of a computing device 510 with a graphical user interface 520. The graphical user interface 520 can provide a user an input interface to display a first content object 560 to a user and display a contemporaneous response object 570 to the user. In one example, the graphical user interface 520 of the computing device 510 can receive the first content object 560. The graphical user interface 520 can display the first content object 560 or a preview image of the first content object 560 to a user of the graphical user interface 520.

The graphical user interface 520 can also include a watch button 580 to provide the user with the option to view the first content object 560. In one example, the computing device 510 can include a content object capturing sub-system. The object capturing sub-system can include a front camera 530, a microphone 540, and a speaker 550. In another embodiment, the content object capturing sub-system can include a back camera. In one example, when the watch button 580 is selected, the graphical user interface 520 can display the first content object 560. Additionally, at a time that is contemporaneous to the graphical user interface 520 displaying the first content object 560, the graphical user interface can also engage the content object capturing sub-system to capture the contemporaneous response object 570. The term contemporaneous response object is defined as storing a response of the viewer that is captured in a time window adjacent to or overlapping with the time window for displaying the content object.

In one embodiment, the contemporaneous response object is a video, audio or photo of the user of the computing device at a time contemporaneous to when the graphical user interface 520 displays the first content object 560. One advantage of capturing the contemporaneous response object 570 at the time contemporaneous to when the graphical user interface 520 displays the first content object 560 is to capture the emotional response of the user upon viewing the first content object 560. For example, when a user first views the content object 560, the emotional response of the user is unfiltered and spontaneous (e.g. the user's initial reaction to the first content object 560). Another advantage of capturing the contemporaneous response object 570 at the time contemporaneous to when the graphical user interface 520 displays the first content object 560 is to provide real-time feedback of the users response to the first content object 560 that can be sent to the sender of the first content object 560. Alternatively, the capturing of the contemporaneous response object 570 may represent the physical or geographical context from which the user is viewing the first content object 560. Further, recording the user viewing the first content object may verify the person who viewed the first content object 560 for security or validation purposes.

In one example, the graphical user interface 520 can include a send button 590. The send button 590 can guide the user to send the contemporaneous response object 570 to another computing device, such as a computing device used to originally send the first content object 560. In another example, the send button 590 can guide the graphical user interface 520 to send the contemporaneous response object 570 to a selected account or location, such as a user account of a computing device for the sender of the first content object 560 or an email address of the sender of the first content object 560. Alternatively, the contemporaneous response object 570 may be sent to a third party for consumption or validation.

Another result of capturing the contemporaneous response object 570 at the time contemporaneous to when the graphical user interface 520 displays the first content object 560 and providing a sending option via the send button 590 of the graphical user interface 520 is that the user of the graphical user interface 520 is provided with the option to send immediate feedback to the sender of the first content object 560. For example, typically a social media platform displays a photo, text, or video to an individual and does not prompt any further action or feedback. Thus, no further action or feedback is prompted and the user of the social media platform that posted the photo, text, or video may not receive feedback from the individual or the feedback may be delayed or the feedback may not be the individual's first reaction.

In one exemplary embodiment, when the graphical user interface 520 prompts action, such as sending the contemporaneous response object 570 at a time contemporaneous to the graphical user interface 520 capturing the contemporaneous response object 570, there is an increase probability that the user will provide feedback in response to the first content object 560. The graphical user interface 520 can include a response menu button 592. The response menu button 592 can guide the user to a response menu screen or page. The response menu screen or page can provide a response menu screen to receive user input for selected user options. In one example, the selected user options can include the length of time the content object capturing sub-system will capture a contemporaneous response object 570, an option to capture a photo, a video or an audio track, an option to enhance or change the contemporaneous response object 570, an option to automatically send the contemporaneous response object 570 after the object has been captured, an option to include audio with the contemporaneous response object 570. In one embodiment, the graphical user interface 520 can provide a field to receive user input, such as text, and the user input can be attached to the contemporaneous response object 570.

In one embodiment, the computing device 510 can provide an indicator to a user of the computing device 510 that a first content object 560 has been received from another computing device. For example, the computing device 510 can indicate (e.g., using an icon, graphic, color notation, etc.) that first content object 560 has been received from another computing device using a message or an email received that includes the first content object 560. In another example, the computing device 510 can indicate the first content object 560 has been received from another computing device by displaying a link, button or directions for viewing the first content object 560. In another example the computing device 510 can automatically open the first content object 560 the graphical user interface 520 when an indicator is received by the computing device 510. In another example the computing device 510 can provide an option to the user of the computing device to open the first content object 560 the graphical user interface 520 when the indicator is received by the computing device 510.

Figure 6:
FIG. 6 illustrates a computing device with another graphical user interface to show a content object in accordance with an example.

FIG. 6 illustrates an example of a computing device 610 with a graphical user interface 620. The graphical user interface 620 can include a message sending status indicator 630. The message sending status indicator 630 can indicate the status of a message containing a contemporaneous response object that is sent to a sender of a first content object, as described in the preceding paragraphs. For example, when the graphical user interface 620 completes sending the a message containing a contemporaneous response object the message sending status indicator 630 can display a message indicating the message was received by the sender of a first content object, such as displaying a response received message. In another example, when the graphical user interface 620 fails to complete sending the message containing a contemporaneous response object the message sending status indicator 630 can display a response received message can display a message indicating the message was not received by the sender of a first content object, such as displaying a response not received message or a try again message. In one embodiment, the graphical user interface 620 can include a send more button 640. The send more button 640 can guide the graphical user interface 620 to capture one or more additional content objects to send to the sender of the first content object. The computing device 610 is substantially similar in other regards to the computing device 510 as described in the preceding paragraphs.

Figure 7:
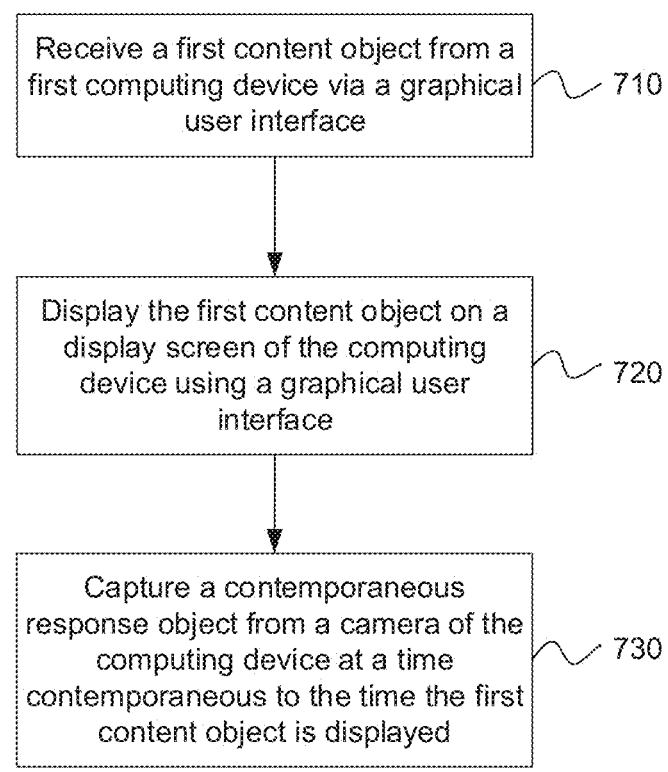
FIG. 7 is a flowchart illustrating an example method for capturing a content object.

FIG. 7 provides a flow chart 700 to illustrate the functionality of one embodiment of the computer circuitry of a computing device that is operable to capture a content object. The functionality may be implemented as instructions on a machine, where the instructions are included on at least one computer readable medium or one non-transitory machine readable storage medium. The computer circuitry can be configured to receive a first content object from a first computing device via a graphical user interface, as in block 710. The computer circuitry can be further configured to display the first content object on a display screen of the computing device using a graphical user interface, as in block 720. The computer circuitry can also be configured to capture a contemporaneous response object from a camera of the computing device at a time contemporaneous to the time the first content object is displayed, as in block 730.

In one embodiment, the computer circuitry or computer instructions are further configured to send the captured contemporaneous response object back to the first computing device using the graphical user interface. In another embodiment, the computer circuitry is further configured to send the captured contemporaneous response object back to another computing device using the graphical user interface. In another embodiment, the content object is a multimedia message, such as a photograph, a video, an audio track, or a short message service (SMS). In another embodiment, the computer circuitry is further configured to display a request to show the first content object on a display screen of the receiving computing device using the graphical user interface. In another embodiment, the computer circuitry is further configured to display the captured content object from the camera of the computing device the graphical user interface. In another embodiment, the computer circuitry is further configured to display a combined view of the first content object and a view from the camera of the computing device. Further, the computer circuitry is further configured to display a combined view of the first content object and the content object. Additionally, the computer circuitry is further configured to receive user input via the graphical user interface and attach the user input to the contemporaneous response object using the graphical user interface.

Figure 8:
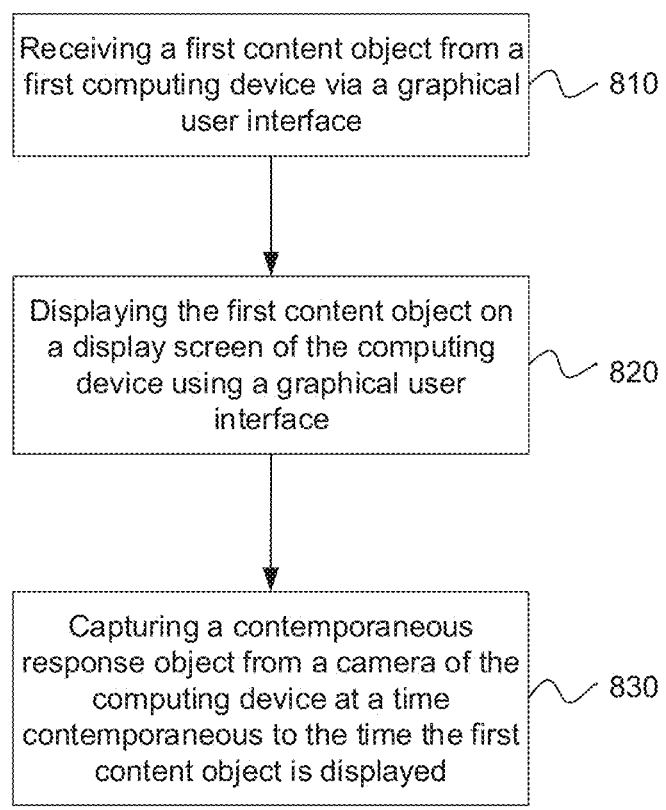
FIG. 8 illustrates a method for capturing a content object in accordance with an example.

Another example provides a method 800 for capturing a content object, as shown in the flow chart in FIG. 8. The method includes receiving a first content object from a first computing device via a graphical user interface, as in block 810. The method also includes displaying the first content object on a display screen of the computing device using a graphical user interface, as in block 820. The method also includes capturing a contemporaneous response object from a camera of the computing device at a time contemporaneous to the time the first content object is displayed, as in block 830.

In one embodiment, the method further comprises sending the captured contemporaneous response object back to the first computing device using the graphical user interface. In another embodiment, the method further comprises sending the captured contemporaneous response object back to another computing device (e.g., a third device or third party) using the graphical user interface. In yet another embodiment, the content object is a multimedia message, such as a photograph, a video, an audio track, or a short message service (SMS). In another embodiment, the method further comprises displaying a request to show the first content object on a display screen of the computing device using the graphical user interface. In yet another embodiment, the method further comprises displaying the captured content object from the camera of the computing device using the graphical user interface. Alternatively, the method further comprises displaying a combined view of the first content object and a live view from the camera of the computing device. In another embodiment, the method further comprises displaying a combined view of the first content object and the contemporaneous response object. In a further embodiment, the method further comprises receiving user input via the graphical user interface and attaching the user input to the contemporaneous response object using the graphical user interface.

Figure 9:
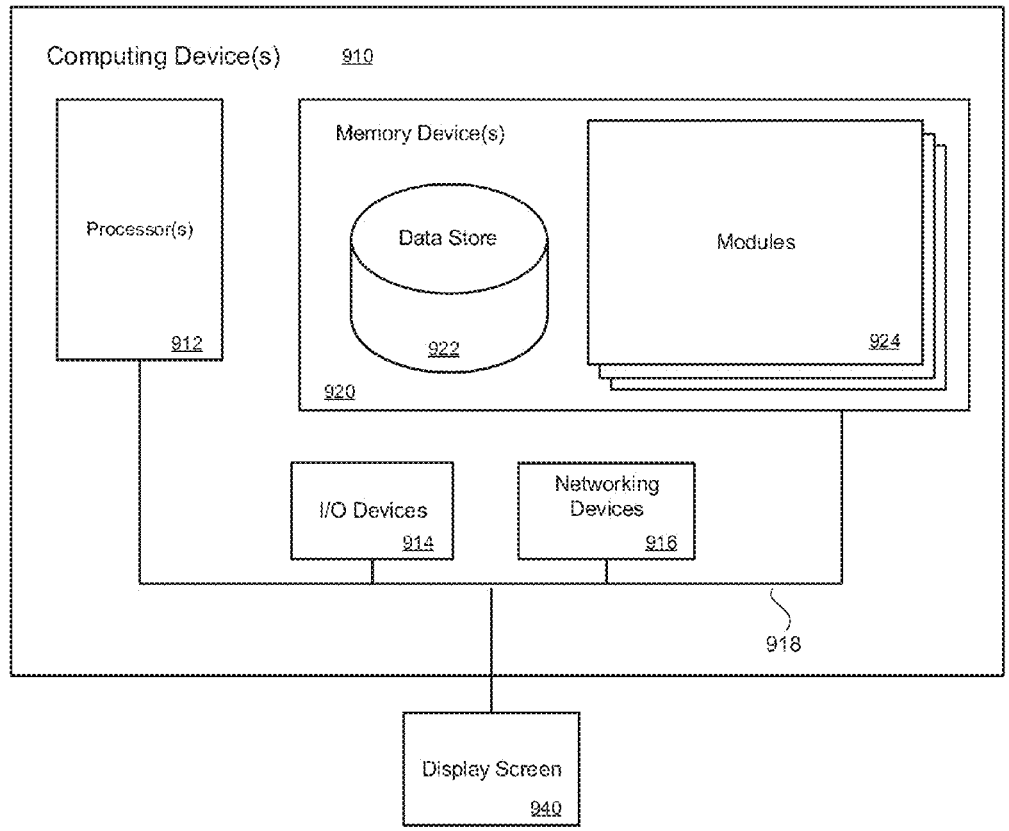
FIG. 9 is block diagram illustrating an example of a computing device that may be used to execute a method for capturing a content object.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules that are executable by the processor(s) 912. In one example, the memory device 920 may contain a quantity extraction module, prediction module, quantity refinement module, index module and other modules that may be located in the memory device 920. The modules 924 may execute the functions described earlier. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 940 that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A computing device operable to capture a content object in a messaging system, having computer circuitry configured to:
   receive a first content object from a first computing device via a graphical user interface at a second computing device, wherein the first content object was previously captured via a sub-system associated with an interface of the first computing device, and wherein the graphical user interface is a client of the interface on the first device;
   display the first content object on a display screen of the second computing device using a graphical user interface;
   capture a contemporaneous response object from a camera of the second computing device at a time contemporaneous to the time the first content object is displayed;
   send the captured contemporaneous response object back to the first computing device using the client with the graphical user interface;
   display a status of the captured contemporaneous response in the graphical user interface regarding whether the captured contemporaneous response was successfully delivered to the interface of the first computing device;
   capture additional content objects at the second computing device in response to the first content object, wherein the additional content objects are captured in response to a selection of a send more button associated with the graphical user interface of the second computing device; and
   send the additional content objects to the first computing device using the client with the graphical user interface subsequent to sending the capture contemporaneous response.

2. The computing device of claim 1, the computer circuitry further configured to send the captured contemporaneous response object back to another computing device using the graphical user interface.

3. The computing device of claim 1, wherein the content object is a multimedia message.

4. The computing device of claim 1, the computer circuitry further configured to display a request to show the first content object on a display screen of the computing device using the graphical user interface.

5. The computing device of claim 1, the computer circuitry further configured to display the captured content object from the camera of the computing device the graphical user interface.

6. The computing device of claim 1, the computer circuitry further configured to display a combined view of the first content object and a view from the camera of the computing device.

7. The computing device of claim 1, the computer circuitry further configured to display a combined view of the first content object and the content object.

8. The computing device of claim 1, the computer circuitry further configured:
to receive user input via the graphical user interface; and
attach the user input to the contemporaneous response object using the graphical user interface.

9. The computing device of claim 1, the computer circuitry further configured to send a real-time live feed of the captured contemporaneous response object back to the first computing device using the graphical user interface.

10. A computing device operable to capture and send a content object in a messaging system, having computer circuitry with executable instructions encoded in a non-transitory medium configured to:
capture a first content object via a first interface of a first computing device;
associating a contemporaneous response request with the first content object via the first interface;
send the first content object with the contemporaneous response request to a second interface at a second computing device to be consumed at a time after the capture of the first content object, wherein the contemporaneous response request will trigger the second interface to capture a contemporaneous response object when the first content object is viewed via the second interface, wherein the second interface is a client of the first interface;
display a status of the sent first content object with the contemporaneous response request in the first interface regarding whether the sent first content object with the contemporaneous response request were successfully delivered to the second computing device;
receive a contemporaneous response object from the second computing device captured by a camera at a time contemporaneous to the time the first content object is displayed; and
receive additional content objects at the first computing device captured at the second computing device in response to the first content object, wherein the additional content objects are captured in response to a selection of a send more button associated with the graphical user interface of the second computing device.

* * * * *